Nov. 14, 1967 R. A. BRANHAM 3,353,108

PULSE WEIGHTING DEMODULATOR

Filed Jan. 6, 1964 2 Sheets-Sheet 1

INVENTOR.
RICHARD A. BRANHAM

BY Julian C. Renfro
ATTORNEY

PULSE WEIGHTING DEMODULATOR

Filed Jan. 6, 1964 2 Sheets-Sheet 2

INVENTOR.
RICHARD A. BRANHAM

BY Julian C. Renfro

ATTORNEY

United States Patent Office 3,353,108
Patented Nov. 14, 1967

3,353,108
PULSE WEIGHTING DEMODULATOR
Richard A. Branham, Orange County, Fla., assignor to Martin-Marietta Corporation, Middle River, Md., a corporation of Maryland
Filed Jan. 6, 1964, Ser. No. 335,718
9 Claims. (Cl. 329—107)

This invention relates to a pulse weighting system and more particularly to a system suited for demodulating pulse position signals. The unit is capable of reducing noise from both commissive and omissive errors and is capable of weighting the input pulses in a variety of ways so that the number of extraneous pulses reaching the audio circuits of the detector is substantially reduced.

Noise reduction circuits are well known and a few of these are applicable to pulse position demodulators. One such arrangement utilizes a sinusoidal or similar type of signal generator for increasing the sensitivity of the pulse position receiver during those periods of time when signals are expected. During intervals when no signals are expected at the receiver, the sensitivity is substantially reduced so that much of the noise occurring during these intervals fails to get through to the audio circuits of the system. Circuits of this type are useful for many applications but are of little help in distinguishing between desired information and noise which may occur during the periods of expected signal reception.

By means of the novel system of the present invention it is possible to distinguish between desired and undesired pulses of equal amplitude in a given time frame which feature greatly increases the system's ability to reject undesired "cross talk" and other interference.

The incoming pulses in a single time frame are weighted on the basis of any one of a number of logic systems so that the largest pulse is the one most likely to be the desired pulse according to the logic system used. For voice demodulation one useful logic system involves weighting the input pulses so that the output analog corresponds to the pulse nearest the center of the sample period if more than one pulse is received. It can be shown that a selection of the pulse nearest the center of a sample period has approximately an 80% probability of being the correct pulse of two pulses, one of which is random. A second logic system requires that the input pulses be weighted so that the output analog corresponds to that pulse which is nearest the position of the previous selected pulse. This system also offers a high percentage of probability that the correct pulse will be selected especially for high sampling rates at the transmitter.

In both the above systems, the circuits are arranged so that the output analog remains unchanged if no pulse is received during a sample period. The demodulation process is "uniform" and is particularly suited for use in time sharing voice transmission systems where all pulses are the same amplitude and one or more interfering pulses may occur along with the desired pulse in a given time period or time frame.

It is therefore one object of the present invention to provide a novel pulse weighting system.

Another object of the present invention is to provide a novel pulse position demodulator.

Another object of the present invention is to provide a novel noise reducing system.

Another object of the present invention is to provide a pulse position demodulator capable of reducing noise from commissive and omissive errors during the demodulation process by the use of pulse weighting circuits.

Another object of the present invention is to provide a system capable of weighting the input pulses in a variety of ways so that the number of extraneous pulses reaching the audio circuits is reduced. In the embodiments illustrated noise reduction is accomplished by weighting the input pulses so that the output analog corresponds either to the pulse nearest the center of the sample period if more than one pulse is received in the period or the output analog corresponds to that pulse which is nearest the position of the previous selected pulse.

These and further objects and advantages of the invention will be more apparent upon reference to the following specification, claims and appended drawings wherein:

Figure 1:
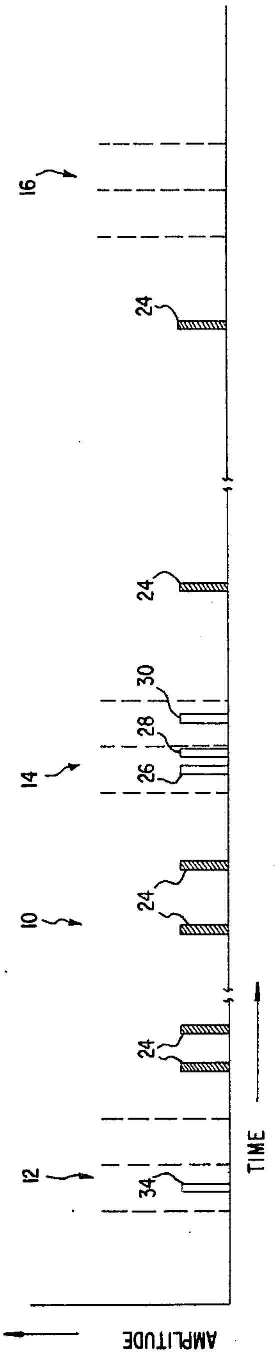
FIGURE 1 shows a portion of a typical pulse train input to the system of the present invention.

While the present invention is directed to a pulse weighting system having general applicability it will be described primarily in conjunction with a co-channel pulse type communication system of the person-to-person type. This system involves a large group of subscribers having intermittent requirement for communication between various pairs of subscribers, who talk upon more or less conventional type telephone equipment without the use of wires or without the use of a central telephone exchange.

The transmitter and receiver combinations carried by each subscriber may advantageously operate upon the same three frequencies such as 140, 141, and 142 megacycles. Each subscriber's voice is "sampled" at the rate of say 8000 samples per second to obtain a number of amplitude samples which are then converted by known pulse modulation techniques to a series of constant amplitude pulses whose positions contain the intelligence. The sampling rate dictates the length of the sample periods or time frames which may be 125 microseconds long, with the position of the one or two microsecond wide pulses in the sample periods representing the intelligence.

In accordance with the basic system each position modulated pulse is converted into three pulses by delay line techniques, which three pulses are coded as a result of a user's manipulation of the dial on a transmitter portion of his unit into a pulse assembly that will be recognized only by the subscriber that he is calling. Each receiver unit is equipped with delay lines which result in that receiver receiving only those pulse assemblies that have been intended for his unit. As will therefore be seen, there is by necessity a considerable amount of sharing of the spectrum in the time domain. Furthermore, the use of very narrow pulses, i.e., one or two microseconds, dictates that the technique employed be a broad band one.

There are a large number of pulse assemblies on the three basic frequencies and a number of simultaneous conversations in the same geographical area may take place. The number of conversations may increase within the capability of the system until pulse density becomes so great as to result in unwanted "cross talk" representing interference between conversing pairs of discrete address units. It is toward the reduction of the effect of this "cross talk" that the present invention is directed. For a more complete description of the overall system reference may be had to assignee's application Ser. No. 107,194, filed May 2, 1961, in the name of McKay Goode for a Discrete Address Communication System With Random Access Capabilities, now Patent No. 3,239,761.

In the present invention, a pulse weighting demodulator is used in combination with a novel pulse selector which might be called a "largest pulse" selector. The largest pulse selector per se forms no part of the present invention and is disclosed and claimed in application Ser. No. 171,494, filed Feb. 6, 1962, in the names of Macdonald J. Wiggins and Lowdy Clifton Layfield, for a Maximum Likelihood Detector and assigned to the assignee of the present invention. This patent application has now become Patent No. 3,212,014, and briefly it involves a detector using no threshold arrangement, but rather one that demodulates upon the highest amplitude pulse of each time frame, this being presumed to be the correct pulse. In accordance with this invention, a selected pulse of a time frame such as the pulse nearest the center of the frame or alternatively nearest the location of the previous pulse, is rendered largest by effectively modulating the input pulses (including extraneous pulses) by a triangular wave whose apex is located within the time frame at the point of preference. Thus, the PPM pulse closest in time to the apex of the triangle becomes the largest pulse, which is thereafter converted into a position analog by the largest pulse selector which demodulates in accordance with the concept that the pulse of highest amplitude in a sample period is the correct pulse.

Figure 2:
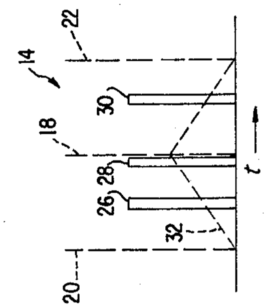
FIGURE 2 is an enlarged view of the time frame 14 of FIGURE 1 illustrating a pulse weighting process.

Referring to the drawings, FIGURE 1, which is a plot of signal amplitude as a function of time, shows a portion of a typical pulse train input to the demodulator generally indicated at 10 and comprising a plurality of sequential sample periods or time frames 12, 14, and 16. As best seen in FIGURE 2, which is an enlarged view of the time frame 14, each time frame may be defined by a center line 18 and a pair of dash lines 20 and 22 defining the beginning and end, respectively, of the time frame. Each frame in FIGURE 1 is spaced at equal intervals along the time axis and is of equal width. During time frame 12, FIGURE 1 illustrates the reception of only a single pulse 34, while frame 14 shows the reception of three pulses 26, 28, and 30. Time frame 16 illustrates the reception of no pulses. The cross hatched pulses 24 represent those pulses which occur between time frames and which are rejected by the circuit of this invention. These pulses of course may be rejected by conventional methods as mentioned above.

Figure 3:
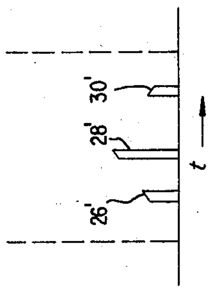
FIGURE 3 shows the effect on the pulses of the weighting process illustrated in FIGURE 2.

Referring to FIGURE 2, time frame 14 is illustrated as including three pulses 26, 28, and 30. These pulses are all of equal amplitude and width, the desired modulation being represented by the distance and direction of the center of a pulse from center line 18 of the time frame. The present invention is directed to the selection of one of the pulses 26, 28, or 30 as that pulse most likely to be the pulse possessing the actual modulation intelligence from the transmitter. This selection in FIGURE 2 is accomplished in part by a pulse weighting involving the generation of a triangular wave form illustrated by the dashed line 32 having its apex coinciding with center line 18 and having identical amplitude but inversely directed slopes on each side of center line 18. The effect of modulating the incoming pulses 26, 28, and 30 by the triangular wave 32 is illustrated in FIGURE 3 by the corresponding pulses 26', 28', and 30'. Since pulse 28 in FIGURE 2 occurs closest to the center line 18, the corresponding pulse 28' has the largest magnitude. Since pulse 26 is slightly closer to the center line than pulse 30, corresponding pulse 26' is slightly larger in FIGURE 3 than pulse 30'.

Figure 4:
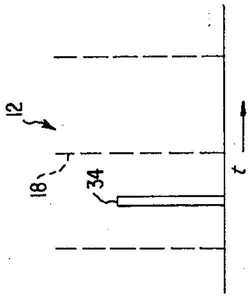
FIGURE 4 is an enlarged view of the next preceding time frame 12 of FIGURE 1.
Figure 5:
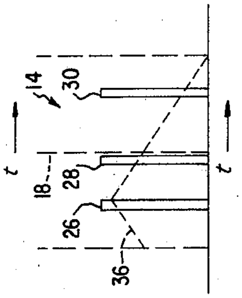
FIGURE 5 is a view of the time frame 14 similar to that of FIGURE 2, but showing a different weighting process.
Figure 6:
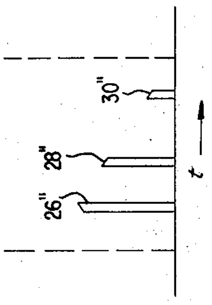
FIGURE 6 illustrates the effect on the pulses of the weighting process of FIGURE 5.

FIGURE 4 shows to an enlarged scale the time frame 12 next preceding time frame 14, the latter again illustrated in FIGURE 5 for the sake of comparison. Time frame 12 is provided with a single pulse 34 and since this is the only pulse occurring in time frame 12, it is accepted by the system as the desired pulse. FIGURE 5 shows the subsequent time frame 14 and illustrates the second method of modulation according to the present invention wherein the incoming pulses 26, 28, and 30 in this time frame are modulated by a triangular wave 36 similar to the wave 32 of FIGURE 2, but with the exception that the apex of wave 36 occurs in its time frame 14 at the same position with respect to the center line 18, as does the center of pulse 34 in its time frame 12 with respect to its center line 18. The effect of this modulation is illustrated in FIGURE 6 where the pulse 26'' now has the greater amplitude since the pulse 26 occurred closest to the apex of the triangular wave 36. Pulse 30 which is the most remote pulse in FIGURE 5 has the smallest counterpart, pulse 30'' in FIGURE 6. Since the largest pulse selector previously described receives the signal train of FIGURE 3 in one embodiment and FIGURE 6 in the other embodiment, the result of the pulse weighting of FIGURE 2 is the selection of the intelligence of pulse 28 whereas that of FIGURE 5 is the selection of the intelligence of pulse 26.

Figure 7:
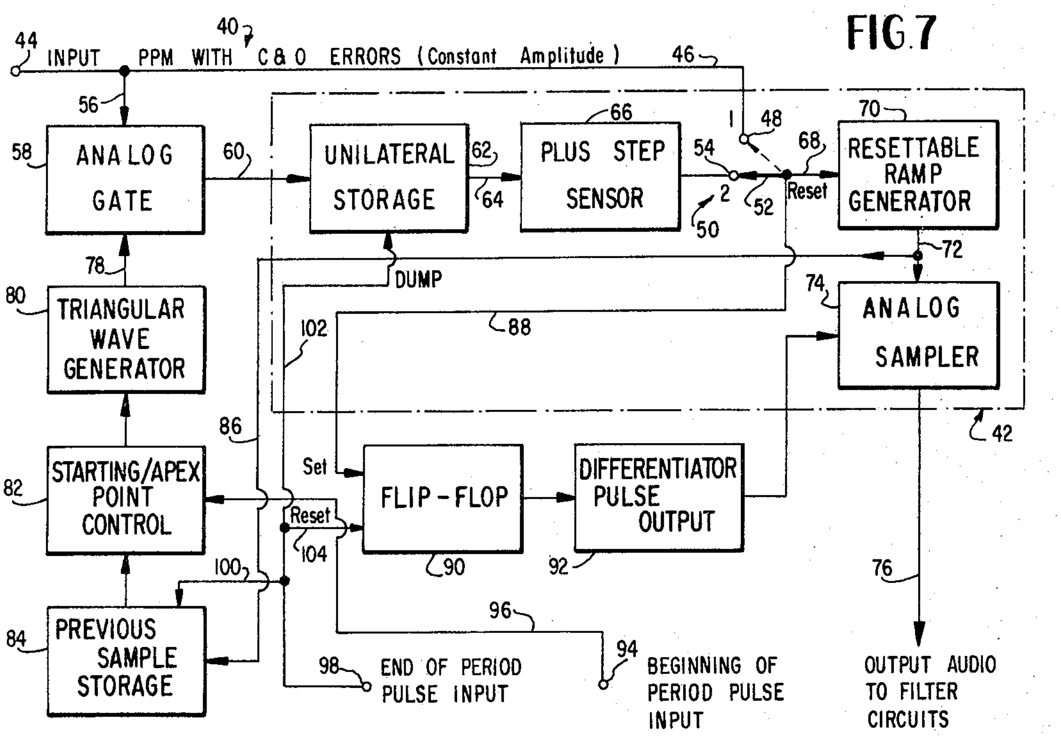
FIGURE 7 is a block diagram showing a pulse position demodulator including a circuit for effecting the weighting process of FIGURE 5.

FIGURE 7 is a block diagram of a pulse position demodulator generally indicated at 40 incorporating pulse weighting of the type illustrated in FIGURE 5. In FIGURE 7 the largest pulse selector portion of the circuit is indicated by the dashed box 42. The circuits within the dashed lines 42 make up a circuit that is also known as a Maximum Likelihood Detector which has already been mentioned. Its function is to produce an output analog on the lead 76 that corresponds to the position of the largest pulse on the lead 60, with a new analog occurring at the end of each sample period. A pulse train such as that illustrated in FIGURE 1 is applied to the demodulator input terminal 44 and this passes by way of lead 46 to a terminal 48 (labeled 1) of a two-position manual switch 50. With the movable element 52 of the switch in the dashed line position illustrated in FIGURE 7, so as to engage terminal 48, the demodulator is set for straight PPM demodulation without any pulse weighting. When movable element 52 engages terminal 54 of the switch (labeled 2), pulse weighting of the type illustrated in FIGURE 5 is incorporated in the circuit.

Input terminal 44 is also connected by way of lead 56 to an analog gate 58. Output from the gate is by way of lead 60 to a unilateral storage device 62 and from there by way of lead 64 to a pulse step sensor 66 feeding terminal 54 of switch 50. Movable element 52 of the switch is connected by lead 68 to a resettable ramp generator 70, the output of which is coupled by way of lead 72 to an analog sampler 74. Output from the demodulator 40 to the audio filter circuits of the receiver in which it is incorporated is from the analog sampler 74 by way of lead 76.

An input is supplied to analog gate 58 by way of lead 78 from a triangular wave generator 80. The wave form produced by generator 80 is under the control of a starting and apex point control circuit 82 in turn governed by a previous sample storage device 84, as more fully described below. Lead 86 supplies a signal from resettable ramp generator 70 to previous sample storage device 84. A signal from the movable element of switch 50 is fed over a "set" lead 88 to a flip-flop 90. Flip-flop 90 feeds a differentiator 92 in turn supplying a signal to the analog sampler 74.

Control terminal 94 connected to a suitable source of clock pulses supplies a beginning of sampling period or time frame pulse input by way of lead 96 to control device 82. A second control terminal 98 also connected to the clock source, supplies control pulses by way of leads 100 and 102 to storage devices 84 and 62, respectively, and also supplies this pulse as a "reset" signal by way of lead 104 to flip-flop 90.

When the switch 50 is set to position 1 for straight PPM demodulation, the operation of the circuit is as follows: The input PPM pulse enters the resettable ramp generator 70 through the switch 50 and resets the ramp to zero, after which the output voltage of this device starts to rise immediately until it either gets a "reset" from another input pulse, or the end of the sample period is reached. When the end of the sample or frame period occurs, the instantaneous value of the ramp voltage is sampled and stored in the analog sampler 74 until the end of the next sample period. Thus it can be seen that the output sample is a position analog of the last "reset" of the ramp generator 70. This principle of last reset is an important one, because it not only provides uniform demodulation but also provides for a posterior sampling which simplifies the implementation of the weighting modes of operation.

In order to effect pulse weighting of the type illustrated in FIGURE 5 the switch 50 is moved to position 2. To implement the pulse weighting operation, it is first necessary to render the desired pulse the largest among all pulses in a time frame. With switch 50 in position (2) the PPM pulses enter the analog gate 58 together with commissive and omissive errors. It is important to note that these pulses are of constant amplitude and function only to open the analog gate. The triangular wave generator 80 also supplies a signal by way of lead 78, which enters gate 58. Each time the gate is opened by one of the PPM pulses a pulse of small duration and equal to the amplitude of the triangular wave is gated into unilateral storage device 62 which is the first unit of the largest pulse selector indicated by the dashed box 42. Since the storage in device 62 is unilateral, the only time additional storage can enter element 62 is when a pulse of greater amplitude than all previous pulses appears at its input. Plus step sensor 66 senses each time a small positive excursion takes place in unilateral storage device 62 and issues a pulse at the output of sensor 66. The output pulse from the plus step sensor 66 serves to reset ramp generator 70. At the end of each sample period analog sampler 74 takes a reading of the ramp generator output. Since the output sample is a voltage analog of the last reset position of the ramp generator, it is the desired output.

The sample voltage from the previous sampling period is fed from the resettable ramp generator 70 by way of lead 86 to storage device 84 where it is stored on signal from the end of period pulse on lead 100. This stored voltage is used to control the location of the apex of the triangle through the starting and apex point control unit 82. The position of the apex is caused to move about from period to period such that it falls within each sample period at the point which was occupied by the last previously selected pulse. When the apex of the triangle occupies this position the largest pulse gated into the storage device 62 is necessarily the one which is nearest in its time frame to the position of the previous selected pulse.

An added feature of the demodulator 40 of FIGURE 7 is the provision of a circuit that inhibits sampling of the resettable ramp generator 70 by the sampler 74 if an omissive error (no PPM pulse) occurs in a time frame as is illustrated by the frame 16 in FIGURE 1. This is brought about by flip-flop 90 which must be "set" during the sample period, because the sampler 74 is actuated by the "reset" of the flip-flop. If there is no "set" then there can be no "reset," and hence the output sample held by the analog sampler 74 is not changed. The overall result is that an omissive error causes simply a repeat of the last sample.

Figure 8:
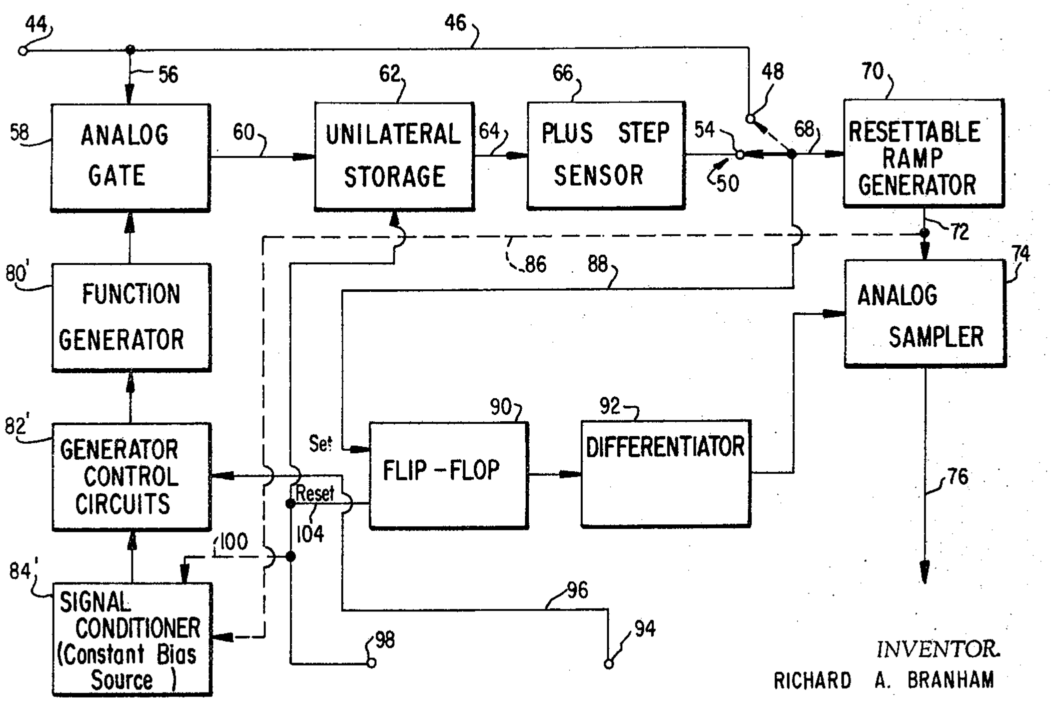
FIGURE 8 is a more generalized block diagram similar to that of FIGURE 7 showing a pulse weighting system incorporating a circuit for effecting the weighting process of FIGURE 2.

The pulse weighting circuits of the present invention are not limited to PPM demodulation. FIGURE 8 is a block diagram similar to that of FIGURE 7 illustrating the more general application of the pulse weighting system of the present invention. In addition the system of FIGURE 8 illustrates pulse weighting by the simpler method illustrated in FIGURE 2 where the apex of the triangular wave coincides with the center line 28 of a time frame. In FIGURE 8, like parts bear like reference numbers.

In FIGURE 8, the previous sample storage 84 is replaced by a more general signal conditioner element 84' which for the weighting method of FIGURE 2 is simply a constant bias source. The starting and apex point control circuits 82 of FIGURE 7 is replaced by the more general generator control circuits 82' and the triangular wave generator is replaced by the more general function generator 80' of FIGURE 8. The inputs to the signal conditioner 84' by way of leads 86 and 100 are indicated in dash lines to show that these are not needed for weighting based upon the center line 18 such as illustrated in FIGURE 2, but they of course would be needed for weighting based upon a prior pulse, such as illustrated in FIGURE 5.

It is apparent that in the more generalized circuit of FIGURE 8 the input pulses need not necessarily be of constant amplitude. Neither is it necessary for the function generator to produce a triangle. For example, it might be desired to select the highest pulse of discrete time periods. Then the function generator issues gate pulses and input pulses are permitted to vary. It is also possible to permit the input pulses to vary and apply a weighting function through the analog gate so that certain pulses have additional amplitude added to them. Other arrangements will readily occur. In brief, if the desired pulse can be modulated by the function generator so as to render it larger than all others, its position analog is gated out by this system at the end of the sample period. The pulse position demodulator of FIGURE 7 therefore may be considered as a special case of the broader circuit of FIGURE 8.

It is apparent from the above that the present invention provides a unique system for demodulating pulse position modulation in the presence of both commissive and omissive errors. The system is capable of weighting the input pulses in a number of ways so that the number of extraneous pulses reaching the audio circuits is reduced. Although the usefulness of the system may be varied as desired, three basic demodulation schemes are illustrated. These are (1) straight PPM, selecting the last pulse of a sample period with no weighting of the input pulses; (2) weighting the input pulses so that output analog corresponds to the pulse nearest the center of the sample if more than one pulse is received in the period; (3) weighting the input pulses so that the output analog corresponds to that pulse which is nearest the position of the previous selected pulse.

In all of the above schemes (1) through (3), the circuits are arranged so that the output analog remains unchanged if no pulse is received during a sample period. The demodulator is in more general terms a pulse weighting system by which a limitless number of pulse position analogs may be extracted from pulse inputs. The demodulation in all cases may be described as uniform.

Weighting scheme (2) listed above, based upon the selection of a pulse nearest the center of a sample period, is estimated to have approximately an 80% probability of selecting the correct pulse of two pulses, one of which is random. This probability criterion assumes no processing of the audio at the transmitter such as compression, preemphasis, etc. Scheme (3) listed above, based upon the position of the next preceding pulse, is believed to be the scheme most likely to produce a correct pulse from audio that is processed at the transmitter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pulse position demodulator comprising input means for receiving a pulse train having a series of spaced time frames in which a position modulated intelligence pulse may appear, said pulse train being subject to interference pulses in said time frames of the same size as said intelligence pulses, an analog gate having one input coupled to said input means, a resettable ramp generator, a unilateral storage and plus step sensor in series coupling the output of said gate to said ramp generator, an analog sampler coupled to the output of said ramp generator, a function generator, and means coupling the output of said function generator to the other input of said analog gate.

2. A pulse position demodulator comprising input means for receiving a pulse train having a series of spaced time frames in which a position modulated intelligence pulse may appear, said pulse train being subject to interference pulses in said time frames of the same size as said intelligence pulses, an analog gate having one input coupled to said input means, a resettable ramp generator, a unilateral storage and plus step sensor in series coupling the output of said gate to said ramp generator, an analog sampler coupled to the output of said ramp generator, a triangular wave generator, means coupling the output of said triangular wave generator to the other input of said analog gate, and means for controlling the apex of the triangular wave from said generator to coincide with a desired location within each of said time frames.

3. A demodulator according to claim 2 wherein said apex control means comprises a constant bias source.

4. A demodulator according to claim 2 wherein said apex control means includes storage means coupled to said triangular wave generator and means for feeding a signal representative of the previous analog sample output from said analog sampler to said storage means.

5. A pulse position demodulator comprising input means for receiving a pulse train having a series of spaced time frames in which a position modulated intelligence pulse may appear, said pulse train being subject to interference pulses in said time frames of the same size as said intelligence pulses, an analog gate having one input coupled to said input means, a resettable ramp generator, a unilateral storage and plus step sensor in series coupling the output of said gate to said ramp generator, an analog sampler coupled to the output of said ramp generator, a triangular wave generator, means coupling the output of said triangular wave generator to the other input of said analog gate, means for controlling the apex of the triangular wave from said generator to coincide with a desired location within each of said time frames, a flip-flop, a differentiator coupling said flip-flop to said analog sampler, and means coupling the output of said plus step sensor to said flip-flop for supplying a set pulse to said flip-flop, whereby the reset of said flip-flop at the end of a sampling period activates said analog sampler.

6. A single channel pulse position demodulator comprising input means for receiving a pulse train, having a series of spaced time modulation frames wherein said modulation frame refers to the interval between the maximum excursions for pulses allowed for a single channel in which a position modulated intelligence pulse may appear, said pulse train being subject to interference pulses in said time frames of the same size as the said intelligence pulses, an analog gate coupled to said input means, a largest pulse selector coupled to said analog gate for producing an analog output representative of the position of the largest pulse supplied to said selector, and a triangular wave generator coupled to said analog gate.

7. A single channel pulse time demodulator containing a pulse weighting system usable for emphasizing the most likely correct pulse in each frame of a series of time modulation frames, wherein modulation frame refers to the interval between the maximum excursions for pulses allowed for a single channel, comprising input means adapted to receive a pulse position modulated pulse train having a series of spaced time modulation frames in each of which an intelligence pulse and random interference pulses may appear, means coupled to said input means for placing an amplitude weighting on all pulses, with the most likely correct pulse receiving the most weight of the group of pulses that may appear in each time modulation frame, said weighting means includes means for applying the most weight to the pulse nearest the center of the time modulation frame and means coupled to said weighting means for producing an output signal representative of the position of the most weighted pulse in each time modulation frame.

8. A single channel pulse time demodulator containing a pulse weighting system usable for emphasizing the most likely correct pulse in each frame of a series of time modulation frames, wherein modulation frame refers to the interval between the maximum excursions for pulses allowed for a single channel, comprising input means adapted to receive a pulse position modulated pulse train having a series of spaced time modulation frames in each of which an intelligence pulse and random interference pulses may appear, means coupled to said input means for placing an amplitude weighting on all pulses, with the most likely correct pulse receiving the most weight of the group of pulses that may appear in each time modulation frame, said weighting means includes means for applying the most weight to the pulse nearest in position in its said time modulation frame to the position of the most weighted pulse in the immediately preceding time modulation frame in which a pulse was selected and means coupled to said weighting means for producing an output signal representative of the position of the most weighted pulse in each time modulation frame.

9. A single channel pulse position demodulator comprising input means for receiving a pulse train having a series of spaced time modulation frames wherein said modulation frame refers to the interval between the maximum excursions for pulses allowed for a single channel, in which a position modulated intelligence pulse may appear, said pulse train being subject to random interference pulses in said time frames of the same size as the said intelligence pulses, means coupled to said input means for modulating said pulse train to modify the amplitude of all pulses of the train, with a single pulse in each time frame being enlarged to a greater extent than any other pulse which may appear in that same time modulation frame, and means coupled to said modulating means for producing an analog output representative of the position of said enlarged pulse.

References Cited

UNITED STATES PATENTS

| | | | |
|---|---|---|---|
| 2,468,058 | 4/1949 | Greig | 328—165 |
| 2,517,579 | 8/1950 | Levy | 329—107 |
| 2,627,575 | 2/1953 | Meacham et al. | 307—88.5 |

ALFRED L. BRODY, *Primary Examiner.*

NATHAN KAUFMAN, ROY LAKE, *Examiners.*